United States Patent [19]

Demko

[11] Patent Number: 4,949,678
[45] Date of Patent: Aug. 21, 1990

[54] DISPOSABLE PET FEEDING DISH

[76] Inventor: Albert J. Demko, 520 S. Collier Blvd., Marco Island, Fla. 33937

[21] Appl. No.: 434,366

[22] Filed: Nov. 13, 1989

[51] Int. Cl.$^5$ .............................................. A01K 5/01
[52] U.S. Cl. ..................................... 119/61; 119/52.1
[58] Field of Search ................ 119/61, 63, 52.1, 51.5

[56] References Cited

U.S. PATENT DOCUMENTS

| 2,542,400 | 2/1951 | Donofrio | 119/61 |
| 2,718,875 | 9/1955 | Schaubel | 119/61 |
| 3,202,131 | 8/1965 | Jones | 119/61 |
| 3,455,280 | 7/1969 | Keene | 119/61 |
| 3,622,036 | 11/1971 | Bongaerts | 119/61 |
| 3,722,476 | 3/1973 | Van Ness et al. | 119/61 |
| 3,731,658 | 5/1973 | Livermore et al. | 119/61 |
| 3,810,446 | 5/1974 | Kightlinger et al. | 119/61 |
| 3,991,719 | 11/1976 | Bruce | 119/61 |
| 4,270,490 | 6/1981 | Kopp | 119/61 |
| 4,721,063 | 1/1988 | Atchley | 119/52.1 |

Primary Examiner—Paul J. Hirsch
Attorney, Agent, or Firm—Merrill N. Johnson

[57] ABSTRACT

A disposable one-piece pet feeding dish having a thin walled central bowl surrounded by a thin walled outwardly sloping skirt, the bottom of the central bowl being substantially flat and lying in the same plane as the lower edge of the dish's skirt, a patch covered with adhesive affixed to the flat outside surface of the bottom of the bowl, and a sheet of release paper covering the adhesive surface of the patch.

2 Claims, 1 Drawing Sheet

U.S. Patent     Aug. 21, 1990     4,949,678
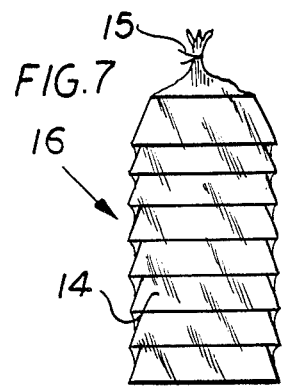
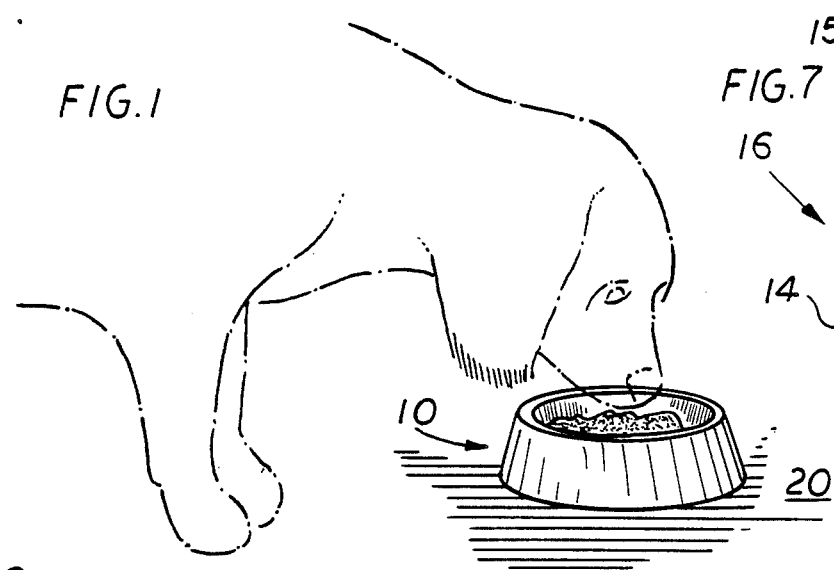
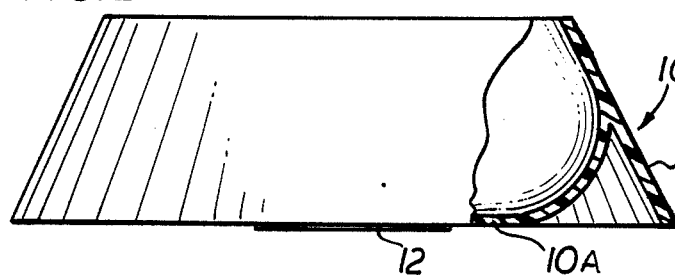
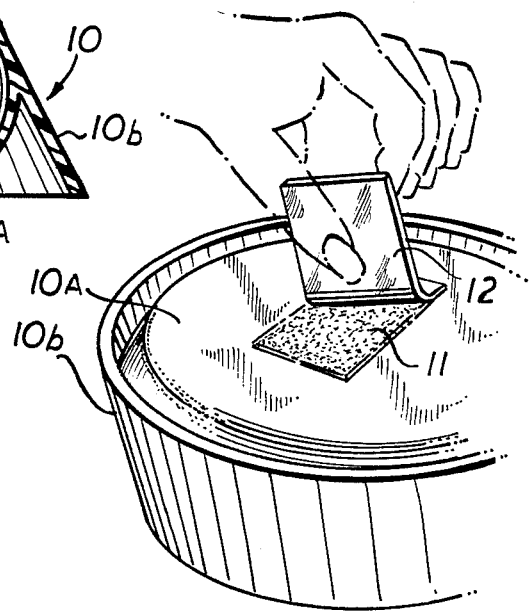
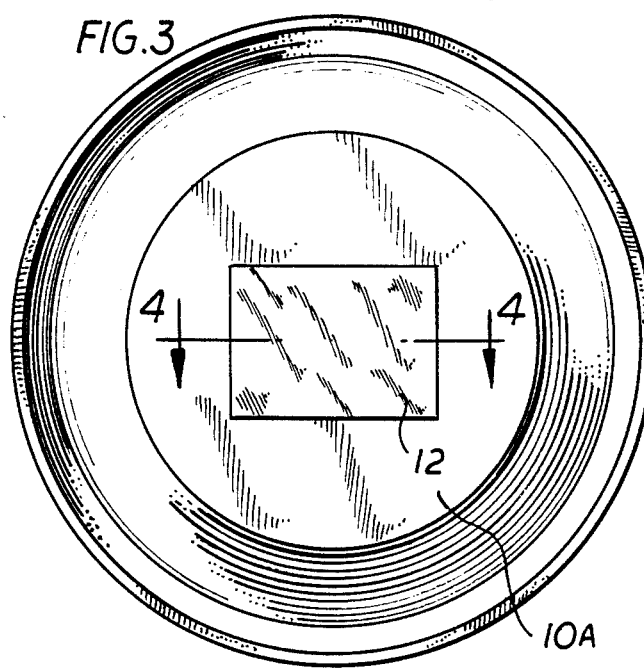
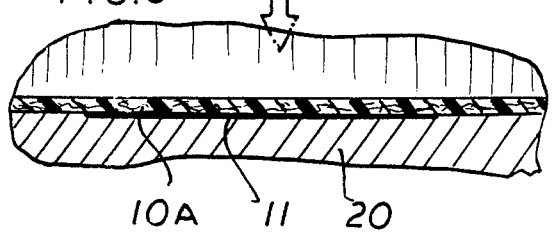
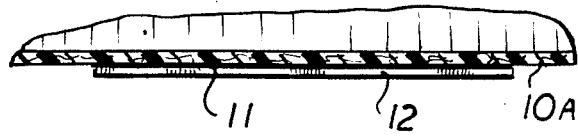

DISPOSABLE PET FEEDING DISH

BACKGROUND AND SUMMARY OF THE INVENTION

My invention relates to a dish or container designed as a container for feeding animals such as dogs, cats and similar domestic pets. More particularly the invention relates to a one-piece thin walled disposable pet feeding dish designed to prevent spilling of the contents of the dish during feeding.

Feeding a domestic pet is usually done on the kitchen floor and usually results in the pet pushing some of its food out of the container and onto the kitchen floor partially due to the container being pushed along the floor as the pet tries to capture food particles from the sides of the container.

Many people dislike having to clean up the pet food spilled on the kitchen floor during feeding and in addition they dislike having to wash out the pet food container after feeding. So far as I am aware, there is no inexpensive disposable pet food dish on the market which is designed to prevent pet food from spilling out of the dish during feeding.

I have invented an inexpensive pet feeding dish designed to minimize food spillage and thus make pet feeding more enjoyable and less time consuming. My pet feeding dish is thin walled and symetrical and thus the dishes can be closely stacked, one on top of the other, into a compact, light weight and inexpensive package for convenient marketing and storage.

Briefly stated, my disposable pet feeding dish is pressed or molded from cellulosic, thermoplastic or metallic material into a one-piece thin walled dish which has a central bowl surrounded by an outwardly sloping frustaconical skirt. The bottom of the central bowl is substantially flat and lies in the same plane as the lower edge of the dish's outwardly sloping skirt. A patch covered with adhesive is affixed to the center of the flat outside surface of the bottom of the bowl and a sheet of release paper covers the adhesive surface of the patch.

I have found that such a pet feeding dish, when temporarily attached to the kitchen floor, provides an extremely stable dish and very little, if any, pet food is spilled onto the kitchen floor. When the pet has finished feeding the dish can be simply picked up from the floor and disposed of in the kitchen trash bag without having to wash or otherwise handle the dish.

BRIEF DESCRIPTION OF THE DRAWINGS

A complete understanding of my invention will be had by reference to the following description and claims in conjunction with the accompanying drawings in which:

FIG. 1 is a perspective view of my disposable pet feeding dish shown on kitchen floor with a pet feeding shown in broken lines;

FIG. 2 is an elevational side view of the pet feeding dish shown in FIG. 1 partially broken away to better show the construction of the dish;

FIG. 3 is a plan view taken from below showing the bottom of my pet feeding dish;

FIG. 4 is a detailed view along line 4—4 of FIG. 3 showing the adhesive patch at the bottom of the dish covered with release paper;

FIG. 5 is a perspective view of my pet feeding dish turned upside down with a hand shown in dotted lines removing the release paper from the patch of adhesive material;

FIG. 6 is a detailed view in cross section showing how the patch of adhesive material is pushed down onto the kitchen floor; and FIG. 7 shows a package of stacked pet feeding dishes.

DETAILED DESCRIPTION OF THE PREFERRED EMBODIMENT

A preferred embodiment of my disposable pet feeding dish 10 is shown on a kitchen floor 20 in FIG. 1 of the drawings. Also shown in FIG. 1 is a pet feeding out of dish 10, the pet being shown in broken lines because it forms no part of my invention.

While my feeding dish may be made by pressing, stamping or molding from any suitable cellulosic, thermoplastic or metallic material, preferred embodiment 10 is molded of cellulosic material which is moisture repellant as a one-piece thin walled feeding dish.

As best shown in FIG. 2 dish 10 consists of a central bowl 10a surrounded by an outwardly flaring frustaconical skirt 10b. Bowl 10a has curved sides and a flat horizontal bottom whose outer surface lies in the same horizontal plane as the lower edge of skirt 10b.

A patch 11 of material covered or impregnated with releasable adhesive is attached to the center of the outer surface of the flat bottom of bowl 10a as best shown in FIGS. 4 and 5. And as shown in FIGS. 3, 4 and 5 a sheet of release paper 12 covers the exposed adhesive surface of patch 11. Release paper 12 is placed on the adhesive surface of patch 11 when dish 10 and patch 11 are joined together at the factory and the release paper is removed as shown in FIG. 5 only when the dish is about to be used for feeding a pet.

After removing release paper 12, the dish is placed on the kitchen floor and finger pressure exerted on the upper surface of the bottom of the bowl 10a. Arrow A shown in dotted lines in FIG. 6 symbolizes downward pressure on bowl 10a to affix dish 10 onto floor 20 due to the adhesive surface of patch 11. Since the lower edge of skirt 10b lies in the same plane as the outer surface of bowl 10a, the lower edge of the skirt is also pressed against floor 20 to add additional stability to the position of the dish on the floor.

The curved inner surface of bowl 10a tends to prevent food being "pushed" up over the upper edge of the dish as the pet's muzzle presses against the inside of the bowl to capture food into the pet's mouth. Of course, since the bowl cannot move due to adhesive patch 11 and the lower edge of skirt 10b, the pet can capture food lodged against the side of bowl 10a even if the pet's muzzle pushes firmly against the side of bowl 10a.

Since dish 10 is symetrical and made of thin walled material, a plurality of dishes 10 can be stacked one on top of another into a convenient package such as package 16 shown in FIG. 7. The package 16 consists of a plurality of dishes 10 stacked one on top of another and then placed in a transparent bag 16 whose upper open end is closed by a twist tie 15.

While I have shown and described a preferred form of my unique disposable pet feeding dish, various changes and modifications of the elements of my invention will be apparent to those skilled in the art without departing from the spirit and scope of m disposable pet feeding dish. Accordingly, the foregoing description and illustration of my invention in no way limits my invention whose scope is limited only by the appended claims.

I claim:

1. A disposable one-piece pet feeding dish which when in use is releasably attached to a surface comprising
    a central bowl surrounded by an outwardly sloping skirt having a planar ring-shaped lower edge,
    the bottom of the central bowl substantially flat and lying in the same plane as the ring-shaped lower edge of the dish's skirt,
    a patch having its upper and lower sides covered with a releasable adhesive affixed by the adhesive on its upper side to the flat outside surface of the bottom of the bowl, and
    a sheet of release paper covering the lower adhesive covered surface of the patch.

2. A disposable one-piece pet feeding dish which when in use is releasably attached to a surface comprising
    a thin walled symetrical bowl surrounded by a thin walled symetrical outwardly sloping skirt ending in a planar ring-shaped lower edge,
    the bottom of the thin walled central bowl being substantially flat and lying in the same plane as the lower ring-shaped edge of the dish's thin walled skirt,
    a thin patch of material, whose upper and lower surfaces are covered with a releasable adhesive which is affixed by the adhesive on its upper surface to the flat outside surface of the bottom of the bowl, and
    a sheet of release paper covering the lower adhesive surface of the patch on the bottom of the bowl.

* * * * *